(12) United States Patent
Chen

(10) Patent No.: US 8,950,919 B2
(45) Date of Patent: Feb. 10, 2015

(54) OPTICAL ELEMENT AND BACKLIGHT MODULE INCORPORATING THE SAME

(71) Applicant: Hon Hai Precision Industry Co., Ltd., New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/050,372

(22) Filed: Oct. 10, 2013

(65) Prior Publication Data

US 2014/0321153 A1   Oct. 30, 2014

(30) Foreign Application Priority Data

Apr. 26, 2013   (TW) .............................. 102114937 A

(51) Int. Cl.
*F21V 7/04*  (2006.01)
*F21V 8/00*  (2006.01)

(52) U.S. Cl.
CPC ............ *G02B 6/0073* (2013.01); *G02B 6/0031* (2013.01)
USPC ............................. 362/606; 362/615; 362/620

(58) Field of Classification Search
USPC .................... 362/606, 615, 620, 626
See application file for complete search history.

(56) References Cited

U.S. PATENT DOCUMENTS

| | | | | |
|---|---|---|---|---|
| 7,909,496 | B2* | 3/2011 | Matheson et al. | 362/609 |
| 8,070,345 | B2* | 12/2011 | Zhang et al. | 362/619 |
| 8,267,538 | B2* | 9/2012 | Lin | 362/97.3 |
| 8,382,355 | B2* | 2/2013 | Kokusho | 362/608 |
| 8,393,774 | B2* | 3/2013 | Krijn et al. | 362/612 |
| 8,770,821 | B2* | 7/2014 | Ijzerman et al. | 362/628 |
| 2009/0196071 | A1* | 8/2009 | Matheson et al. | 362/623 |
| 2010/0027292 | A1* | 2/2010 | Yeh | 362/615 |
| 2011/0149595 | A1* | 6/2011 | Lin et al. | 362/606 |

* cited by examiner

*Primary Examiner* — Ali Alavi
(74) *Attorney, Agent, or Firm* — Novak Druce Connolly Bove + Quigg LLP

(57) ABSTRACT

An optical element includes a light guide plate, a reflector received in a mounting hole of the light guide plate, and a supporting rod secured to and extending upwardly from the reflector. The light guide plate defines the mounting hole extending through the light guide plate from a top face to a bottom face thereof. The reflector includes a mounting surface coplanar with the top face of the light guide plate and a tapered reflecting face extending slantwise downwardly and inwardly from the mounting surface thereof. A backlight module incorporating the optical element is also provided. The backlight module has an LED located in the mounting hole and faces the reflecting face, and a diffuser plate secured to a top end of the supporting rod.

20 Claims, 5 Drawing Sheets

OPTICAL ELEMENT AND BACKLIGHT MODULE INCORPORATING THE SAME

TECHNICAL FIELD

The present disclosure relates generally to an optical element and a backlight module incorporating the optical element, wherein the backlight module has an improved light intensity distribution and structural simplicity.

DESCRIPTION OF RELATED ART

LEDs are solid state light emitting devices formed of semiconductors, which are more stable and reliable than other conventional light sources such as incandescent bulbs. Thus, LEDs are being widely used in various fields such as numeral/character displaying elements, signal lights, light sources for lighting and display devices.

Nowadays, light emitting diode (LED) light sources are widely applied in the backlight module. However, the LED light source is a spot light source, thus an irradiation range of the LED light source is restricted. In addition, a light intensity distribution of the LED light source is mostly concentrated at an optical axis while becomes gradually weaker towards a periphery thereof.

Furthermore, in order to create a sufficient light mixing length between the LED light sources and a diffuser plate, it is common to dispose a plurality of fixture brackets between the LED light sources and the diffuser plate, which increases the structural complexity and cost of the backlight module.

What is needed therefore is an optical element and a backlight module incorporating the optical element which can overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
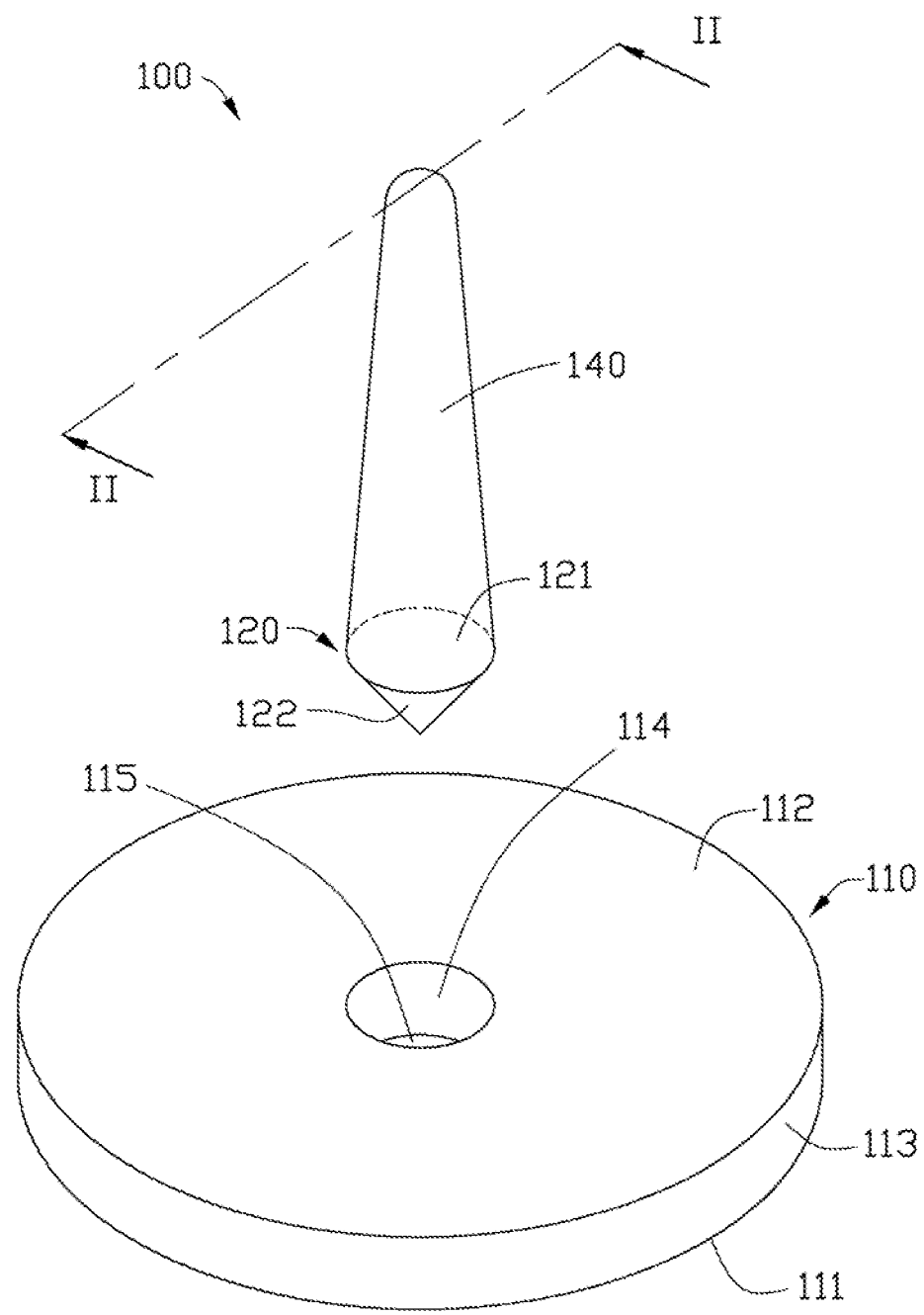
FIG. 1 is an exploded, perspective view of an optical element in accordance with a first embodiment of the present disclosure.
Figure 2:
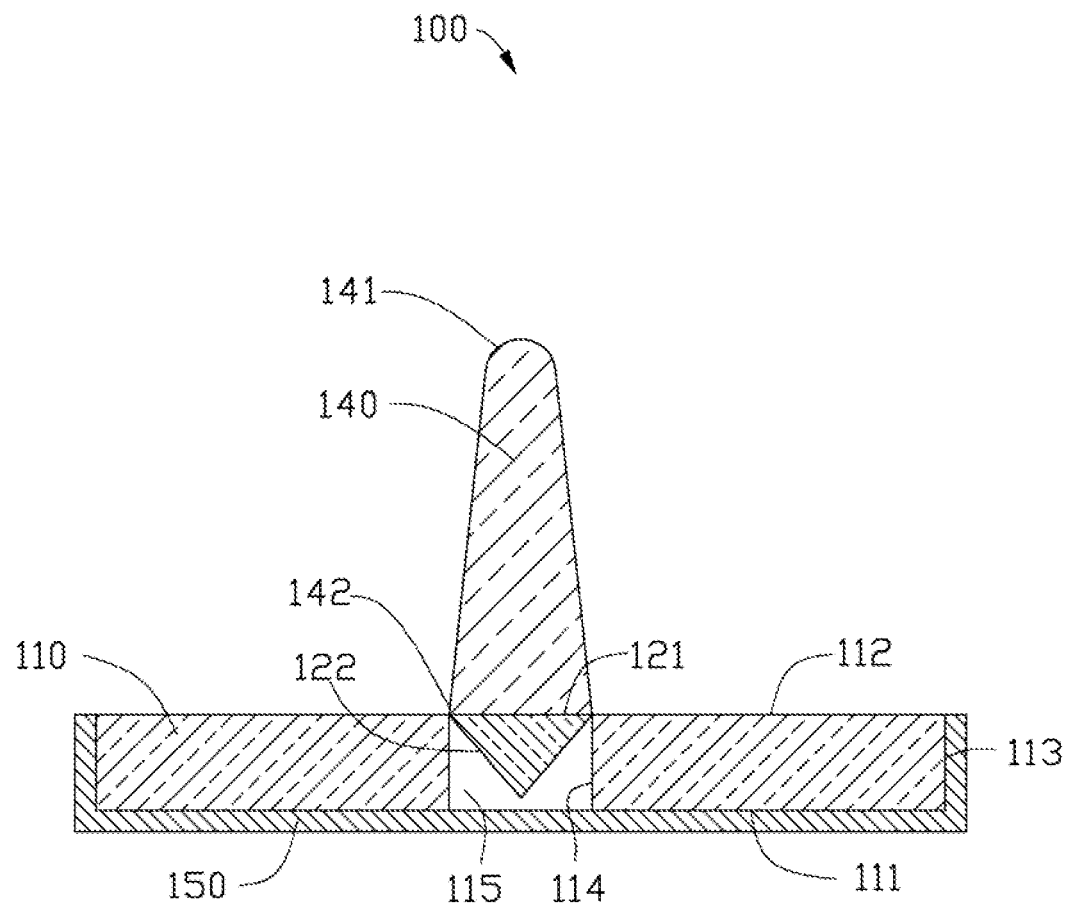
FIG. 2 is an assembled, cross-sectional view of the optical element of FIG. 1, taken along a line II-II thereof, and shows a reflective layer attached to an external surface of a light guide plate of the optical element of FIG. 1.

Referring to FIGS. 1 and 2, an optical element 100 in accordance with a first embodiment of the present disclosure includes a light guide plate 110, a reflector 120 coupled to the light guide plate 110, and a supporting rod 140 located above the light guide plate 110 and fixed to a top side of the reflector 120.

The light guide plate 110 includes a top face 112, a bottom face 111 parallel to the top face 112 and a cylindrical sidewall 113 extending therebetween. The cylindrical sidewall 113 interconnects an outer periphery of the top face 112 and an outer periphery of the bottom face 111.

The light guide plate 110 defines a mounting hole 115 in the top face 112 thereof. The mounting hole 115 extends through the light guide plate 110 from the top face 112 to the bottom face 111. In the present embodiment, the light guide plate 110 is disk-shaped. The mounting hole 115 is located at a center of the light guide plate 110. The mounting hole 115 is cylindrical and an apex of the reflector 120 is spaced from the bottom face 111 of the light guide plate 110 when the light guide plate 110, the reflector 120 and the supporting rod 140 are assembled together by inserting the reflector 120 into the mounting hole 115.

The reflector 120 includes a mounting surface 121, and a tapered reflecting face 122 extending slantwise downwardly and inwardly from an outer periphery of the mounting surface 121. The reflector 120 is received in the mounting hole 115 of the light guide plate 110. The mounting surface 121 of the reflector 120 is coplanar with the top face 112 of the light guide plate 110. The mounting surface 121 is defined by the top side of the reflector 120.

The supporting rod 140 has a fixing end 142 and a free end 141. The fixing end 142 is connected to the mounting surface 121 of the reflector 120. The free end 141 is distant from the light guide plate 110. A cross-sectional diameter of the supporting rod 140 increases gradually from the free end 141 to the fixing end 142 thereof. The fixing end 142 of the supporting rod 140 has a size slightly larger than that of the mounting hole 115 of the light guide plate 110 whereby the fixing end 142 can be interferentially inserted into the mounting hole 115 to engage with the light guide plate 110.

In the present embodiment, the supporting rod 140 is made of transparent or translucent material such as glass or polycarbonate, for transmission of the light rays emitted from the light source therethrough. The supporting rod 140 has a refractive index different from that of the reflector 120. Alternatively, the supporting rod 140 and the reflector 120 are integrally formed together as a single piece. That is to say, the tapered reflecting face 122 of the reflector 120 which extends slantwise downwardly and inwardly from the fixing end 142 of the supporting rod 140 is formed by coating a reflective material on a periphery of the reflector 120, wherein the reflector 120 is made of a material the same as that for forming the supporting rod 140 and formed as a monolithic piece with the supporting rod 140.

The optical element 100 includes a reflective layer 150 attached to an external surface of the light guide plate 110. The reflective layer 150 extends from the bottom face 111 of the light guide plate 110 to the cylindrical sidewall 113 thereof. The top face 112 of the light guide plate 110 is exposed from the reflective layer 150, i.e., free of the reflective layer 150.

Figure 3:
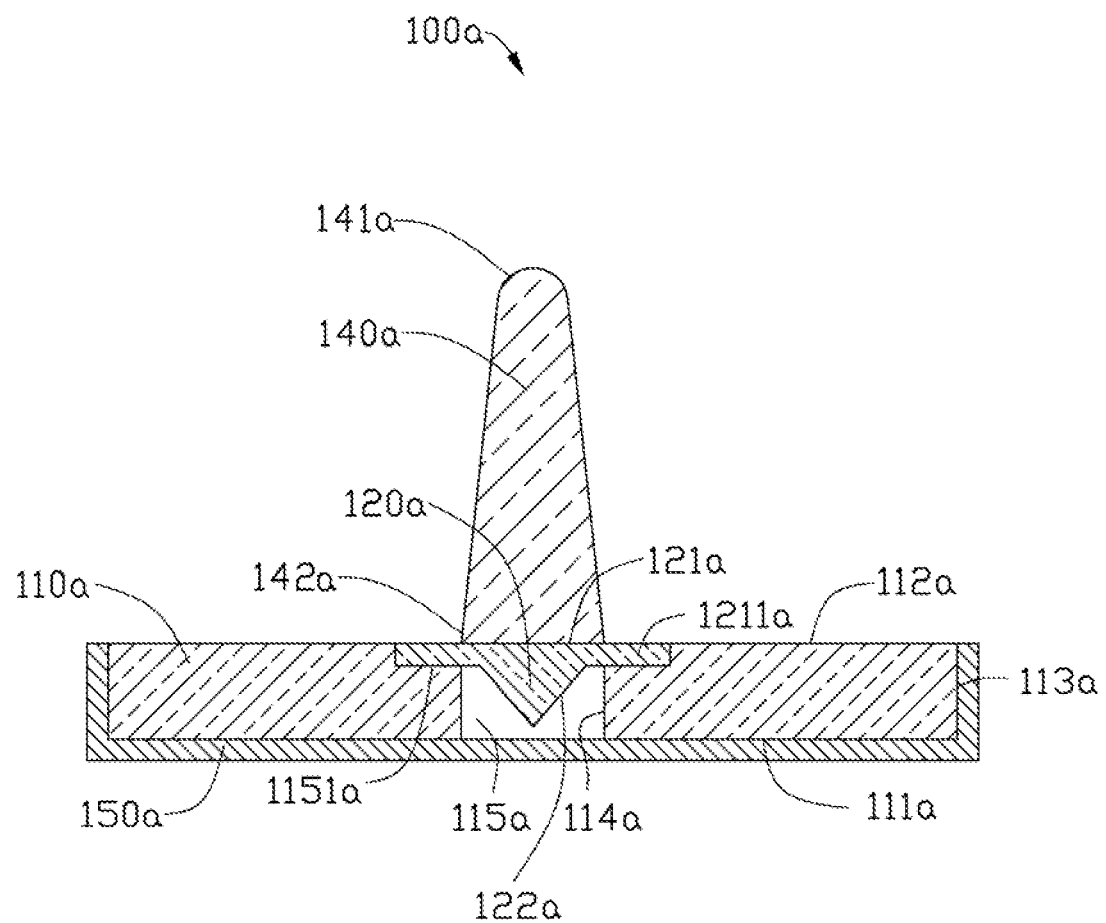
FIG. 3 is an assembled, cross-sectional view of an optical element in accordance with a second embodiment of the present disclosure.

Referring to FIG. 3, different from the optical element 100 shown in FIG. 2, a reflector 120a of an optical element 100a in accordance with a second embodiment of the present disclosure further includes an annular flange 1211a projecting outwardly from an outer periphery of the mounting surface 121a thereof, and the light guide plate 110a defines an annular groove 1151a in the top face 112a and around the mounting hole 115a for receiving the annular flange 1211a of the reflector 120a therein. The groove 1151a of the light guide plate 110a communicates with the mounting hole 115a thereof. The reflector 120a is spaced from the reflective layer 150a.

Figure 4:
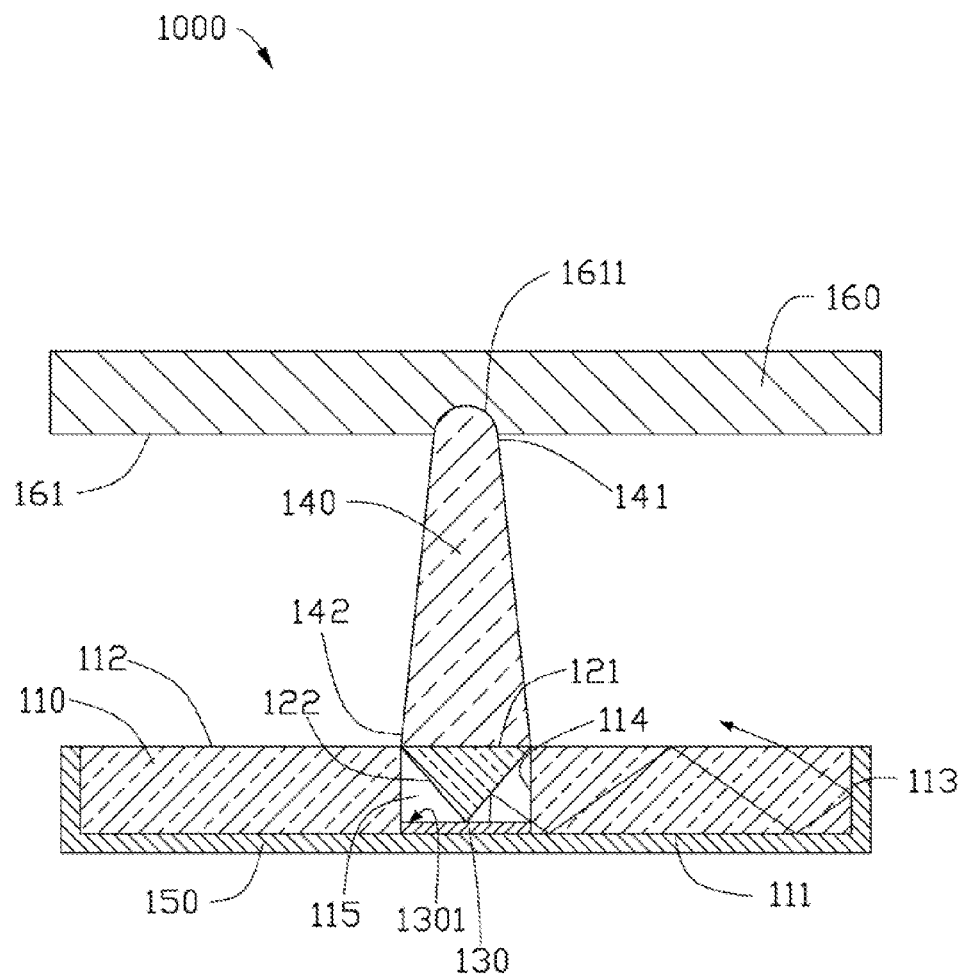
FIG. 4 is an assembled, cross-sectional view of a backlight module incorporating the optical element of FIG. 2.

Referring to FIG. 4, a backlight module 1000 incorporating the optical element 100 shown in FIG. 2 is illustrated. The backlight module 1000 includes the light guide plate 110, the reflector 120 coupled to the light guide plate 110, the supporting rod 140 located above the light guide plate 110 and connected to a top side of the reflector 120, an LED light source 130 received in the mounting hole 115 and located under the reflector 120, and a diffuser plate 160 fixed to the free end 141 of the supporting rod 140.

A bottom face 161 of the diffuser plate 160 defines a recess 1611 therein. The free end 141 of the supporting rod 140 is received in the recess 1611 of the diffuser plate 160. That is to say, the supporting rod 140 is disposed between the diffuser plate 160 and the light guide plate 110, whereby the diffuser plate 160 is spaced a predetermined distance from the light guide plate 110.

The LED light source 130 is received in the mounting hole 115 of the light guide plate 110. A light emitting face 1301 of the LED light source 130 faces the reflecting face 122 of the reflector 120. In the present embodiment, the LED light source 130 is located between the reflector 120 and the reflective layer 150, and the LED light source 130 is placed on the reflective layer 150, wherein the LED light source 130 contacts with an apex and spaced from the reflecting surface 122 of the reflector 120. Alternatively, a distance of a gap between an apex of the tapered reflector 120 and the reflective layer 150 could be changed according to the actual requirements of the light intensity distribution. The LED light source 130 can also be spaced a distance from the apex of the reflector 120.

Figure 5:
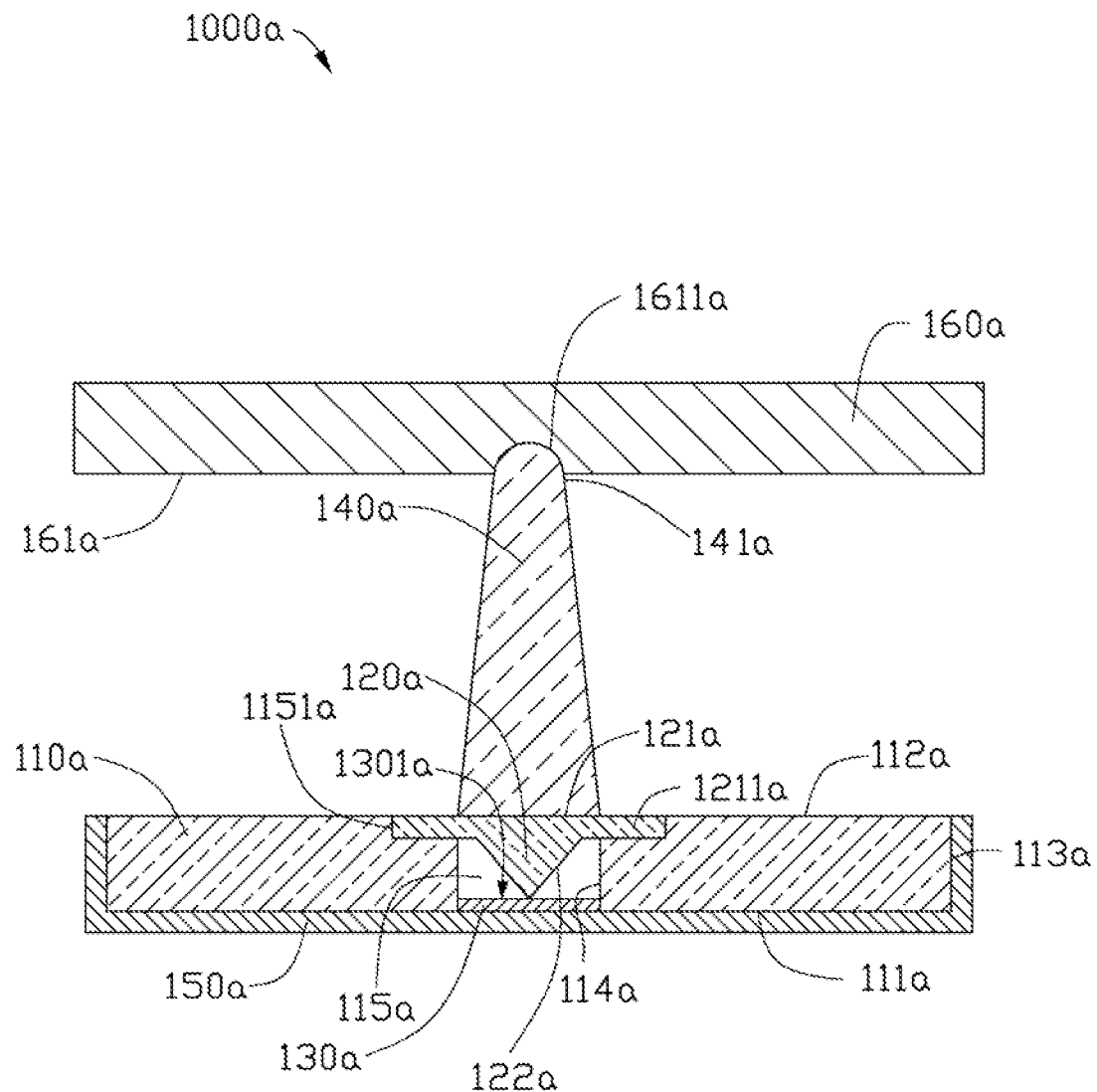
FIG. 5 is an assembled, cross-sectional view of a backlight module incorporating the optical element of FIG. 3.

Referring to FIG. 5, different from the backlight module 1000 shown in FIG. 4, the reflector 120a of a backlight module 1000a further includes the annular flange 1211a projecting outwardly from an outer periphery of the mounting surface 121a thereof, and the light guide plate 110a defines an annular groove 1151a in the top face 112a thereof for receiving the annular flange 1211a of the reflector 120a therein. The groove 1511a of the light guide plate 110a communicates with the mounting hole 115a thereof. The reflector 120a is spaced from the reflective layer 150a. An LED light source 130a is received in the mounting hole 115a and positioned between the reflective layer 150a and the reflector 120a.

In the present disclosure, the tapered reflector 120 (120a) is located above the LED light source 130 (130a) to reflect light rays from the LED light source 130 (130a) laterally toward the disk-shaped light guide plate 110 (110a); then the light rays are refracted into the light guide plate 110 (110a) through an inner face 114 (114a) of the light guide plate 110 (110a) and reflected by the reflective layer 150 (150a) toward the top face 112 (112a) of the light guide plate 110 (110a), whereby a spot light source of each of the LED light sources 130, 130a is converted into a surface light source. Thus, the backlight module 1000 (1000a) having a uniform light intensity distribution is obtained.

In addition, the supporting rods 140, 140a which are disposed between the diffuser plates 160, 160a and the light guide plates 110, 110a, are connected with the reflectors 120, 120a or integrally formed with the reflectors 120, 120a before the reflectors 120, 120a are assembled into the mounting holes 115, 115a. Thus, the present backlight modules 1000, 1000a can have a simple structure which is easier to manufacture and accordingly has a lower cost. Since the supporting rods 140, 140a are connected to the top sides of the reflectors 120, 120a and are made of light transmissive material, the supporting rods 140, 140a will not block the light rays emitted from the LED light sources 130, 130a from reaching the diffuser plates 160, 160a, which can effectively improve the light utilization rate of the LED light sources 130, 130a of the backlight modules 1000, 1000a.

It is to be understood that in an alternative embodiment, the reflective layer 150 (150a) could define a through hole (not shown) at a position corresponding to and aligned with the mounting hole 115 (115a) of the light guide plate 110 (110a), and the LED light source 130 (130a) has a size slightly larger than that of the mounting hole 115 (115a). The LED light source 130 (130a) is interferentially engaged in the mounting hole 115 (115a) of the light guide plate 110 (110a) and held in position by an interferential engagement between the inner face 114 (114a) of the light guide plate 110 (110a) and the LED light source 130 (130a).

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical element for converting a light from an LED (light emitting diode) into a surface light, comprising:
   a light guide plate comprising a top face, a bottom face parallel to the top face and a cylindrical sidewall extending therebetween, and the light guide plate defining a mounting hole configured for receiving the LED therein, the mounting hole extending through the light guide plate from the top face to the bottom face thereof;
   a reflector received in the mounting hole of the light guide plate, configured to face the LED; and
   a supporting rod secured to and extending upwardly from a top side of the reflector and located above the light guide plate;
   wherein the reflector comprises a mounting surface coplanar with the top face of the light guide plate and a tapered reflecting face extending slantwise downwardly and inwardly from the mounting surface thereof, configured to reflect light from the LED to move laterally into the light guide plate.

2. The optical element of claim 1, wherein the reflector further comprises an annular flange projecting outwardly from an outer periphery of the mounting surface thereof, the light guide plate defines an annular groove in the top face thereof for receiving the annular flange of the reflector therein, and the groove of the light guide plate surrounds and communicates with the mounting hole thereof.

3. The optical element of claim 1, further comprising a diffuser plate located above and spaced from the light guide plate, wherein the diffuser plate is fixed to an end of the supporting rod distant from the light guide plate.

4. The optical element of claim 1, wherein the light guide plate is disk-shaped, and the mounting hole is located at a center thereof.

5. The optical element of claim 4, wherein the mounting hole of the light guide plate is cylindrical, and an apex of the reflector is spaced a distance from the bottom face of the light guide plate.

6. The optical element of claim 4, wherein a reflective layer covers the bottom face and the cylindrical sidewall of the light guide plate.

7. The optical element of claim 6, wherein the reflective layer defines a through hole aligned with the mounting hole of the light guide plate.

8. The optical element of claim 1, wherein a cross-sectional diameter of the supporting rod decreases gradually along a direction away from the light guide plate.

9. The optical element of claim 8, wherein an end of the supporting rod connected to the mounting face of the reflector has a size slightly larger than that of the mounting hole of the light guide plate.

10. The optical element of claim 1, wherein the reflector and the supporting rod are made of a same material which is light transmissive and formed as a monolithic piece, and the reflecting face is formed by coating a reflective material on an outer periphery of the reflector.

11. A backlight modules comprising:
an LED light source;
an optical element coupled to the LED light source, and the optical element comprising:
a light guide plate comprising a top face, a bottom face parallel to the top face and a cylindrical sidewall extending therebetween, and the light guide plate defining a mounting hole extending through the light guide plate from the top face to the bottom face thereof;
a reflector received in the mounting hole of the light guide plate; and
a supporting rod secured to and extending from a top side of the reflector and located above the light guide plate;
wherein the reflector comprises a mounting surface coplanar with the top face of the light guide plate and a tapered reflecting face extending downwardly and inwardly from the mounting surface thereof; and
wherein the LED light source is received in the mounting hole of the light guide plate and faces the reflecting face of the reflector.

12. The backlight module of claim 11, wherein the reflector further comprises an annular flange projecting outwardly from an outer periphery of the mounting surface thereof, the light guide plate defines an annular groove on the top face thereof for receiving the annular flange of the reflector therein, and the groove of the light guide plate surrounds and communicates with the mounting hole thereof.

13. The backlight module of claim 11, wherein the light guide plate is disk-shaped, and the mounting hole is located at a center thereof.

14. The backlight module of claim 13, wherein the mounting hole of the light guide plate is cylindrical, and an apex of the reflector is spaced from the bottom face of the light guide plate.

15. The backlight module of claim 13, wherein a reflective layer covers the bottom face and the cylindrical sidewall of the light guide plate.

16. The backlight module of claim 15, wherein the reflective layer defines a through hole aligned with the mounting hole of the light guide plate.

17. The backlight module of claim 15, wherein the LED light source is located between the reflector and the reflective layer, and the LED light source is spaced from the reflector.

18. The backlight module of claim 11, further comprising a diffuser plate located above and spaced a distance from the light guide plate, wherein the diffuser plate is fixed to an end of the supporting rod distant from the light guide plate.

19. The backlight module of claim 18, wherein a cross-sectional diameter of the supporting rod decreases gradually along a direction away from the light guide plate.

20. The backlight module of claim 11, wherein the supporting rod is integrally formed with the reflector as a monolithic piece.

* * * * *